(12) United States Patent
Mueller-Marc et al.

(10) Patent No.: US 8,520,289 B2
(45) Date of Patent: Aug. 27, 2013

(54) DISPLAY ELEMENT COMPRISING A REFLECTOR

(75) Inventors: Oliver Mueller-Marc, Appenzell (CH); Andriy Bitman, Dortmund (DE)

(73) Assignee: Advanced Display Technology AG, Appenzell (CH)

( * ) Notice: Subject to any disclaimer, the term of this patent is extended or adjusted under 35 U.S.C. 154(b) by 645 days.

(21) Appl. No.: 12/612,758

(22) Filed: Nov. 5, 2009

(65) Prior Publication Data

US 2010/0123946 A1 May 20, 2010

(30) Foreign Application Priority Data

Nov. 18, 2008 (DE) .................. 10 2008 057 848

(51) Int. Cl.
*G02B 26/00* (2006.01)
(52) U.S. Cl.
USPC .......................................... 359/290; 359/291
(58) Field of Classification Search
USPC ................................................ 359/290, 291
See application file for complete search history.

(56) References Cited

U.S. PATENT DOCUMENTS

| | | | |
|---|---|---|---|
| 6,120,588 A | 9/2000 | Jacobson | |
| 6,781,731 B2 | 8/2004 | Choi | |
| 6,967,762 B2 * | 11/2005 | Machida et al. | 359/296 |
| 7,304,786 B2 | 12/2007 | Hagood | |
| 2002/0122159 A1 | 9/2002 | Choi | |
| 2006/0060870 A1 | 3/2006 | Park | |
| 2008/0085652 A1 | 4/2008 | Winters | |

FOREIGN PATENT DOCUMENTS

| | | |
|---|---|---|
| DE | 10141561 A1 | 9/2002 |
| DE | 10307852 A1 | 9/2004 |
| EP | 0288586 A1 | 11/1988 |

OTHER PUBLICATIONS

L. Hou, N.R. et al., "Electrowetting Manipulation of Any Optical Film", Applied Physics Letters, AIP, American Institute of Physics, Melville, NY, US, Bd. 90, Nr. 25, Jun. 22, 2007, Seiten 251114-251114, XP012095340 ISSN: 0003-6951.
Neil R. Smith, et al., "A New Form of Flat Optics Enabled by Electrowetting Microprisms", Lasers & Electro-optics Society, IEEE, IEEE, PI, Oct. 1, 2006, Seiten 819-820, XP031004360, ISBN: 978-0-7803-9556-5.

* cited by examiner

*Primary Examiner* — James Jones
(74) *Attorney, Agent, or Firm* — Marshall & Melhorn, LLC

(57) ABSTRACT

The invention relates to a display element for the display of a plurality of a colors and a method for their display.
For this purpose, the invention teaches a display element 1 based on one or more color-producing surfaces 2 which can be oriented parallel to the viewing direction 3 of an observer, for example, so that the observer views only the narrow edges of the surfaces 2. The actual content is perceptible only because a movable reflector 4 is also provided in which the color-producing surface 2 is reflected.
The display element claimed by the invention has a particularly good aperture. In the case of static images, the power consumption of the display element is very low. In one preferred embodiment, the display element also makes possible the presentation of a large color space and can be independent of the presence of ambient light.

12 Claims, 2 Drawing Sheets

DISPLAY ELEMENT COMPRISING A REFLECTOR

FIELD OF THE INVENTION

This invention relates to the field of display elements of the type that are used in large numbers in high-resolution displays, for example. In particular, the invention relates to a display element for the representation of a plurality of colors as well as a method for said purpose.

PRIOR ART AND DISADVANTAGES

The prior art describes many different types of displays which are based on the use of individual pixels, called display elements in this application. For the representation of the desired information, the display is first broken down into individual pixels which are then represented by means of the display elements.

The prior art also describes a large number of different methods for the construction of various configurations of display elements. Electrically operated displays are encountered with particular frequency, such as TFT (Thin-Film Transistor) displays, for example. For special purposes, technologies based on fluid methods have also been proposed, such as, for example, the displays manufactured by Liquavista (NL) as described in U.S. Pat. No. 7,304,786, for example. Finally, display elements based on solid particles are also known which are based on the optional visualization of a partly colored small particle. Examples of these displays are the products manufactured by E-Ink Corporation (USA) as described, for example, in U.S. Pat. No. 6,120,588 ("Electronically addressable microencapsulated ink and display thereof").

One major goal in the design of a display which is based on a plurality of display points is thereby the best possible utilization of the space available. Depending on the exact configuration of an individual display element, the full surface occupied by the individual display element is thereby not available for the display of the pixel, because a portion of the surface visible from the viewing direction of an observer (viewing direction) is occupied by the periphery of the display element (boundary area with the neighboring display elements, wiring etc.). The ratio between the total surface area of the display and the surface area which is actually available for the display of the pixels must thereby be as large as possible. Accordingly the ratio is 1 for an optimally utilized display area, while a ratio of only 0.5 is available for a display in which 50% of the display area is not available for the representation of the pixels on account of peripheral requirements.

An additional problem in the representation of pixels lies in the sometimes high current consumption of the pixels. In particular in applications in which static images predominate ("electronic books", billboard advertising), particular attention must be paid to low power consumption, especially because in applications of this type recourse to mobile power sources is frequently necessary.

Another problem that frequently occurs in such applications is the representation of content in color. For this purpose, either a plurality of individual colors are placed on top of one another (subtractive method) or the individual colors are placed next to one another (additive method). While in the first case the brightness of the display decreases with the number of levels that have to be traversed, displays that utilize the additive method have the disadvantage of a small aperture. In the display of an individual in which the other colors remain deactivated, the aperture can be as low as 0.33. In particular with regard to the above mentioned applications ("electronic books", billboard advertising), to make a long story short, it can be said that no satisfactory solutions for this problem exist.

OBJECT OF THE INVENTION AND SOLUTION

The object of the invention is accordingly to overcome the above mentioned disadvantages of the prior art. Among other things, the invention should have the best possible aperture. The power consumption of the display should also be as low as possible, in particular during the display of static images, and it should also be possible to display information in color.

For this purpose, the invention teaches a device in the form of a display element and a method. Accordingly, the display element claimed by the invention is based on one or more color-producing surfaces which can be oriented parallel to the viewing direction of an observer, for example, so that the observer views only the narrow edges of the surfaces. The actual content is perceptible only because a movable reflector is also provided in which the color-producing surface is reflected.

Additional preferred embodiments of the invention are described in the dependent claims and in the detailed description below with reference to the accompanying figures.

DESCRIPTION

The invention utilizes the knowledge that to achieve a high aperture, the smallest possible peripheral areas should be present in a display element. For this purpose, the display element comprises, for each color to be displayed, an individual color-producing surface that is colored the corresponding color. The at least one color-producing surface is thereby oriented parallel or to or inclined in relation to the viewing direction of an observer. One advantageous result of this arrangement is that it is essentially not "visible" from the observer's viewing direction, whereby the term "visible" as used below means visibility of the color-producing surface(s) from the viewing direction. The color-producing surfaces are preferably perpendicular to a base surface of the display element or exactly parallel to the viewing direction, so that seen from this viewing direction, only the narrow edge of the respective color-producing surface is visible. The corresponding surface inclination angle $\beta$ is then 90 degrees. However, because the color-producing surface is responsible for the color impression, although the surface itself occupies almost no space inside the display element, it is possible in this manner to achieve a particularly good aperture.

For the case of one or more inclined color-producing surfaces, the surface inclination angle $\beta$ is advantageously set so that it is between 90 degrees (parallel to the viewing direction) and 120 degrees, so that there is an acute angle (0 to 30 degrees) between the viewing direction and the plane of the respective surface(s).

In addition, the display element claimed by the invention comprises at least one movable reflector. So that the content of the color-producing surface is then visible to the observer, the at least one reflector can be moved so that when seen from the viewing direction, a variable portion of the color-producing surface is visible. In other words, depending on the position of the reflector, a variable-size projection of the image of the color-producing surface is visible from outside the device. If the angle of inclination $\alpha$ between the reflector surface and the base surface of the display element is measured, the maximum possible projection of the color-producing service is visible at an angle of inclination of exactly 45 degrees. At an angle of inclination of 90 degrees, the observer views the edge of the reflector, so that the observer gets the impression of a black image. At an angle of inclination of 0 degrees, the reflector is perpendicular to the viewing direction, so that the impression is of a bright image, if the exterior is bright.

In one advantageous embodiment, the display element comprises a plurality of color-producing surfaces. The surfaces can thereby display different colors, or can display different intensities of the same color. The sequence of colors can follow the known patterns "R-G-B", or "C-Y-M-K" for example, and can also optionally include a black, grey and/or white color. Preferably, the color-producing surfaces essentially have the same surface content and/or the same shape. Alternatively, however, it is possible that, depending on the requirements of the image to be displayed, the color-producing surfaces can also have suitably modified contents and/or shapes. The surface inclination angle β at which the color-producing surfaces are oriented in the display element is preferably 90 degrees. In one alternative embodiment, this angle is defined so that the reverse sides of the color-producing surfaces are visible from the direction of an observer, which leads to correspondingly modified (reduced) angles of inclination of the reflector. In an additional alternative embodiment, the angle β can be varied for at least one of the color-producing surfaces. The angle β is preferably variable for all surfaces.

So that the contents of the color-producing surfaces are visible by the observer, it is necessary for the at least one reflector to be appropriately movable. In this manner, arbitrary portions of each color-producing surface and/or arbitrary portions of a plurality of different color-producing surfaces can be made visible. For this purpose, it is necessary for the reflector to be capable of executing correspondingly complex movements.

For this purpose it is preferable that the at least one reflector has at least one axis of movement, whereby a first axis of movement runs perpendicular to the viewing direction. A second axis of movement runs either also perpendicular to the first axis of movement or can be rotated around an axis that points in the viewing direction. In other words, the reflector preferably has either two axes of inclination and/or one axis of inclination and one axis of rotation. Depending on the constructive possibilities, one variant or the other will be preferable; the result is essentially identical. Additional axes of movement can also be provided.

So that the at least one reflector can be moved, the display element claimed by the invention also comprises at least one drive system for the at least one reflector. Basically, all of the drive systems known from the prior art can be used to generate the required movement. The at least one drive system is preferably selected from the group comprising electric motors, electrostatic drive systems, fluid drive systems and electrowetting.

Electric motors are thereby preferably servomotors.

Electrostatic drive systems preferably use the reflector as the main electrode and a plurality of base electrodes located on the floor and/or the walls or on the color-producing surfaces of the display element.

Fluid drives are preferably hydraulic drives, although they can alternatively also be pneumatic. Water, or oil and air respectively can preferably be used as the medium. The transformation of the fluid energy (pressure) into a movement can preferably be achieved by means of corresponding bellows.

A drive system by means of electrowetting utilizes the fact that a fluid which is composed of a non-polar component (e.g. oil) and a bipolar component (e.g. water) can be steered by an electrical field. If, for example, a fluid is in a container with a square cross section (corresponding to a display element with four color-producing surfaces), for example, a defined contact angle is formed on each color-producing surface, which can be influenced, for example, by means of a hydrophobic or hydrophilic coating in its "idle position". Corresponding electrodes are located on the vertical walls of the container. By applying a voltage to one of these electrodes, the surface energy of the fluid is influenced in the vicinity of the electrical field that emanates from the electrode, as a result of which the contact angle to the respective electrode and thus the color-producing surface varies. For example, the level of the fluid on the wall with the highest electrode voltage (e.g. 50 V) is set to the highest level and the level of the fluid on the wall with the lowest electrode voltage (e.g. 10 V) is set to the lowest level. Between these two levels, the level of the fluid drops almost uniformly. By using all of the walls available, the surface of the liquid can, within certain limits, be set at in any desired position. If the surface of the fluid itself is used as a reflector, or if the surface supports such a reflector, the fluid can be used by means of electrowetting as a drive system for the (virtual, and in the cited exemplary case defined by the walls of the display element) axes.

The reflector can therefore be realized in the form of a solid, liquid or gas mirror. The solid mirror can be a solid amorphous or crystalline or metal mirror. The mirror is preferably fully covered by a reflective surface, although in an additional exemplary embodiment it can also be partly permeable for certain or all visible wavelengths. If, for example, a white light source is provided underneath the display element, when the light source is activated it is easily possible to create the impression of a bright white pixel. For example, if the reflector is permeable for infrared radiation, it can be captured by an infrared sensor located below the reflector. If, accordingly, there are a great many fine-resolution display elements available in a regular pattern "array", a display of this type can simultaneously be used for face or fingerprint recognition, for example.

In an alternative embodiment, the reflector is realized in the form of the reflective surface of a liquid. For this purpose, for example, metals such as mercury which are liquid at room temperature are particularly suitable, as well as all other liquids that have a sufficient reflectivity for the desired wavelengths. Alternatively, the invention teaches that the liquid consists of a two-phase or multi-phase mixture, whereby a totally reflective layer is formed between at least two phases.

In an additional embodiment, the invention teaches that the curvature of the surface of the liquid can be influenced so that a plurality of individual reflectors are formed. This can be accomplished, for example, locating a plurality of corresponding electrodes, each of which can be activated individually, below the surface of the liquid. By activating a defined electrode, the surface of the liquid above it is exposed to an electrical field, which in the presence of suitable properties of the liquid (electrowetting effect) leads to an attraction or repulsion of the surface of the liquid, so that the curvature changes accordingly. In this manner it is possible to generate a plurality of separate reflectors, or to combine them if desired into a single large-area reflector.

In an additional exemplary embodiment, the color-producing areas are luminescent. For this purpose the color-producing surfaces can consist of organic light emitting diodes (OLEDs), for example. LEDs of this type have the advantage, in addition to their inherent luminescence, that they are also variable in terms of their coloration. Their luminous intensity is likewise variable. As a result of the use of luminescent color-producing surfaces it is possible to eliminate external sources such as environmental light, for example. This is advantageous in dark environments in particular. It is also particularly advantageous to be able to adapt the respective color of a specified surface to the corresponding conditions. In the case of a single reflector for each display element, the reflector can no longer be realized in the form of two color-producing areas next to each other. However, if it were necessary to display the desired mixed color only by means of color-producing surfaces that do not lie directly next to one another, the corresponding mixed color could not be displayed. This problem can be elegantly bypassed by using surfaces that are variable in terms of their coloration. The number of color-producing surfaces required can also be reduced in the event of a large color space to be displayed.

In one preferred embodiment, the horizontal projection of the volume formed by the color-producing surfaces has the shape of a regular or irregular polygon. With three color-producing surfaces, for example, the result is an equilateral or isosceles triangle; with four color-producing surfaces the result is a square, triangle or trapezoid, etc. The color-producing surfaces thereby form the side walls of the corresponding body which forms the boundaries of the display element.

Alternatively, the invention teaches that the color-producing surfaces are arranged in the form of a ring. That means that the color-producing surfaces do not form a plane but transition into one another. The transition can thereby be abrupt, or alternatively the transition can also be continuous. If the interior surface of the ring contains the entire color space to be displayed, for example, by rotating the reflector the desired sector of this color space can be reflected outward. For this purpose, the reflector is advantageously in a concave shape, so that the small sector located on the ring, seen from the outside, fills up the entire surface of the reflector as much as possible. A divergent lens can be located downstream of the reflector to improve the viewing angle.

The invention also discloses a method for the display of at least one color using the device claimed by the invention.

The invention is thereby broken down into the following steps:

Definition of the desired color to be displayed;
Determination of the configuration of the display element that comes closest to this color;
Activation of the display element.

The definition of the desired color to be displayed is thereby preferably created with assistance from a corresponding electronic device, such as a computer and/or a graphics card, for example.

In the next step in which the configuration of the display element that comes closest to this color is determined, on one hand a computer is in turn preferably used which prepares the desired color signal, and on the other hand the capabilities of the display element claimed by the invention are stored in the form of a model. The respective optimal configuration is calculated by approximation of the colors that can be displayed by the display elements claimed by the invention to the desired color signal.

This step is followed by the activation of the display element or elements. Depending on the embodiment of the device claimed by the invention, the activation is in turn divided into a plurality of steps.

If and to the extent possible, first the luminous intensity of the individual color-producing surfaces is adjusted. In this manner more or less bright images or corresponding levels of grey or saturations can be generated.

Then the color of the individual color-producing surfaces is adjusted, if and to the extent that such a capability is provided in the concrete embodiment of the device claimed by the invention.

Then the drive system or mechanisms for the reflector or reflectors of the individual display element are activated.

Preferably the steps described above for the activation of the display element are executed simultaneously, to thereby achieve the fastest possible display of the respective pixel. Alternatively the steps can also be executed one after another, but in a sequence that differs from the sequence described above by way of example. The simultaneous activation of all the other display elements of which a corresponding display is made up is particularly advantageous.

As described above, the device claimed by the invention primarily offers the capability of a particularly good aperture. As a result of the use of perpendicular color-producing surfaces in connection with a movable reflector which reflects parts of these surfaces externally, a display element is created that has very small peripheral areas that are not usable for the display. Depending on the concrete realization of the drive mechanism for the reflector, the drive system can be configured so that after reaching a specified position it retains this position without an further power consumption, which results in a very low power consumption in the event of static images. As a result of the use of a correspondingly large number of color-producing surfaces in the interior of a display elements or with the preferred use of a ring that is color-producing on its inside, a large color space can be displayed. As a result of the optional use of luminescent color-producing surfaces or other light sources integrated into the display element the display can if desired be made independent of the presence of ambient light.

LIST OF FIGURES

FIG. 1A is a schematic view of an exemplary embodiment of the display element claimed by the invention with four color-producing surfaces.

FIG. 1B is the schematic view shown in FIG. 1 with an inclined and rotated reflector.

FIG. 2 is a schematic view of an exemplary embodiment of the display element claimed by the invention with a ring as the color-producing surface.

FIG. 3 is a schematic view of an additional exemplary embodiment of the display element claimed by the invention with an additional divergent lens.

Figure 1A:
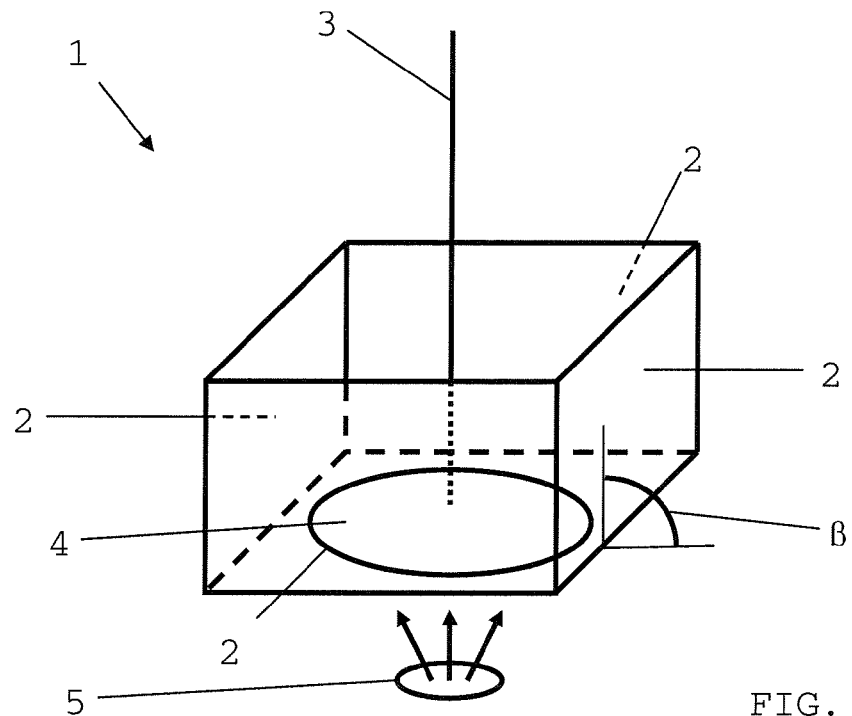
FIG. 1A presents a schematic view of an exemplary embodiment of the display element 1 claimed by the invention with four color-producing surfaces 2. The color-producing surfaces 2 are arranged so that they form the sides of a square body, on the base surface of which the reflector 4 is located. In the illustrated exemplary embodiment, the reflector is round, although it can alternatively also be square, for example. In the illustrated exemplary embodiment, the reflector 4 is in approximately the plane of the base surface of the square body, although in an exemplary embodiment which is not illustrated it can also be advantageous to position the reflector 4 somewhat above the base surface to have a greater freedom of movement.

The color-producing surfaces 2 are also oriented parallel to the viewing direction 3, as a result of which there is a surface inclination angle β of 90 degrees. In this manner an observer cannot see the content of the color-producing surfaces 2 directly, but sees only the narrow upper edges of the surfaces and the reflector 4. In the illustrated exemplary embodiment, the reflector is oriented so that light which falls from the viewing direction 3 into the display element 1 is directed reflected out again, so that in the event of a bright environment, the impression of a bright pixel is created. So that bright pixels can also be generated for display in a dark environment, a light source 5 is located underneath the reflector. This light source can preferably be a white light source. Its light can reach a viewer either through a semi-permeable reflector 4, or the reflector can be set parallel to the viewing direction for the case of an exclusively light pixel (not shown). If the pixel is to remain dark, the light source is deactivated. If intermediate stages are to be displayed, the light source can be made dimmable.

Figure 1B:
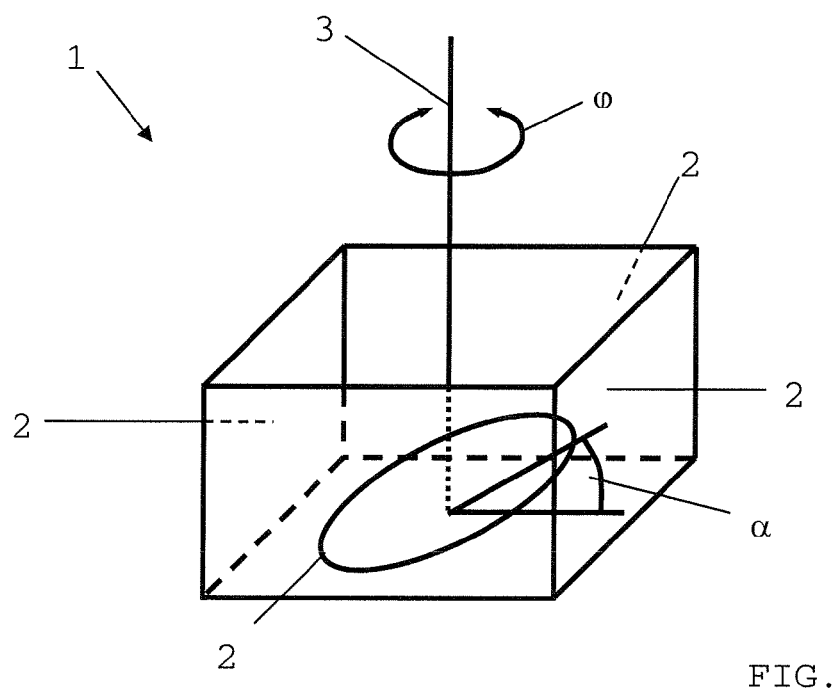

FIG. 1B is the schematic view of FIG. 1 with an inclinable and rotatable reflector 4, but without the light source 5. The angle of inclination α is formed between the surface of the reflector 4 and the base surface of the display element 1. The figure does not show the parts of the display element 1 that are necessary for the inclination (drive system). In the illustrated exemplary embodiment, the center of rotation is in the center of the reflector 4. However, it can also be advantageous to place the center of rotation in some other location, for example on the periphery of the reflector 4; in particular then, if there is only one single color-producing surface 2, or if the reflector 4 is also mounted so it can rotated, as indicated in this case by the angle of rotation φ.

By means of a combination of inclination and rotation, the reflector can be oriented so that either no color-producing surface 2 at all is visible (angle of inclination α=90 degrees), so that exactly one single colored surface 2 is visible (angle of rotation φ equals 90/180/270/360 degrees; orientation α greater than 0 and less than 90 degrees), or so that two color-producing surfaces 2 adjacent to each other are visible (angle of rotation φ not equal to 90/180/270/360 degrees). It is clear that in the illustrated exemplary embodiment, only colors can be displayed that result from the mixing of two adjacent color-producing surfaces 2. To attenuate this limitation, a plurality of color-producing surfaces 2 can be provided (not shown), in which case colors can also optionally be repeated. It is particularly advantageous if the color-producing surfaces 2 are realized so that their color can be varied, for example by means of the utilization of organic light-emitting diodes (see above description).

Figure 2:
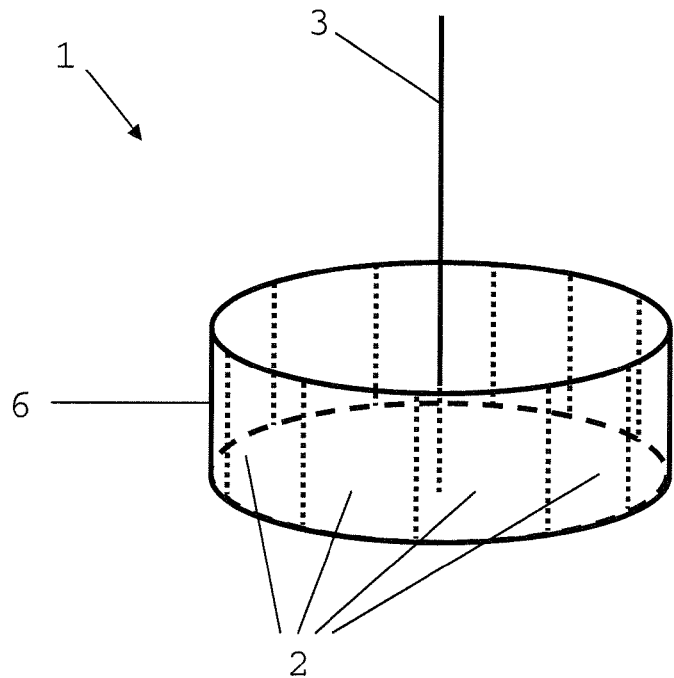

FIG. 2 is a schematic view of an exemplary embodiment of the display element 1 with a ring 6 as the color-producing surface 2. For reasons of simplicity, the figure does not show the reflector 4. In this exemplary embodiment, the color-producing surfaces 2 are not realized in the form of flat segments but are located on the interior surface of a cylinder (ring 6). The transitions between the individual color-producing surfaces 2 are indicated by the dotted lines. Alternatively, the invention teaches that the color-producing surfaces 2 need not be abrupt, but can also transition smoothly into one another, so that a particularly good mixing of colors can be achieved. In this case the ring 6 can contain on its inside the entire desired colored to be displayed, whereby for example the colors with low saturation can be located in the lower area and the colors with high saturation can be located in the upper area (not shown). For the case illustrated here it is advantageous if the reflector 4 (not shown) is concave (in the manner of a concave mirror), so that only a small portion of the inside of the ring 6 is reflected outward. Also not shown in FIG. 2 are the drive system or mechanisms and a light source 5, if one if present.

Figure 3:
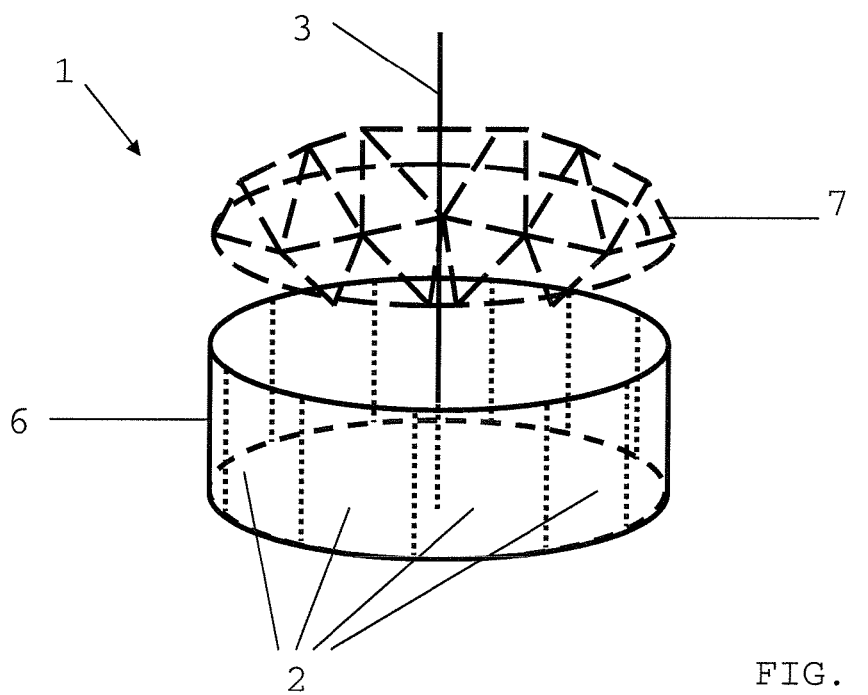

FIG. 3 is a schematic view of an additional exemplary embodiment of the display element 1 claimed by the invention. This embodiment is the same as the embodiment illustrated in FIG. 2, although it also contains a divergent lens 7 which is located at some distance from the ring 6. The divergent lens 7 improves the viewing angle.

LIST OF REFERENCE NUMBERS AND ABBREVIATIONS

1 Display element
2 Color-producing surface
3 Viewing direction
4 Reflector
5 Light source
6 Ring
7 Divergent lens
α Angle of inclination
β Surface inclination angle
φ Angle of rotation

The invention claimed is:

1. Display element (1) for the display of at least one color, whereby each display element comprises a color-producing surface (2) colored with a corresponding color and at least one movable reflector (4), characterized in that the color-producing surface (2) is oriented parallel to or is inclined with respect to a viewing direction (3), that the at least one reflector (4) can be moved such that a variable portion of the color-producing surface (2) is visible from the viewing direction (3), and that the reflector (4) is realized in the form of solid, liquid or gas mirrors.

2. Display element (1) as recited in claim 1, characterized in that it comprises a plurality of color-producing surfaces (2), and that the at least one reflector (4) can be moved such that any desired portions of any color-producing surface (2) and/or any desired portions of a plurality of different color-producing surfaces (2) are visible.

3. Display element (1) as recited in claim 1, characterized in that the at least one reflector (4) has at least one axis of movement, whereby a first axis of movement runs perpendicular to the viewing direction (3).

4. Display element (1) as recited in claim 3, characterized in that a second axis of movement of the reflector (4) either runs perpendicular to the first axis of movement or can be rotated in an axis that points in the viewing direction (3).

5. Display element (1) as recited in claim 1, characterized in that it also comprises at least one drive system for the at least one reflector (4), which is preferably selected from the group comprising electric motors, electrostatic drives, fluid drives and electrowetting.

6. Display element (1) as recited in claim 1, characterized in that the reflector (4) is realized in the form of a solid amorphous or crystal or metal mirror.

7. Display element (1) as recited in claim 1, characterized in that the reflector (4) is realized in the form of a reflecting surface of a fluid.

8. Display element (1) as recited in claim 7, characterized in that the curvature of the surface of the fluid can be influenced so that a plurality of individual reflectors are formed.

9. Display element (1) as recited in claim 1, characterized in that the color-producing surfaces (22) are luminescent and/or are variable in terms of their luminous intensity and/or their color.

10. Display element (1) as recited in claim 1, characterized in that the color-producing surfaces (2) are arranged in the shape of a regular polygon.

11. Display element (1) as recited in claim 1, characterized in that the color-producing surfaces (2) are arranged in the shape of a ring.

12. Display element as recited in claim 1, characterized in that a divergent lens is located downstream of the reflector (4).

* * * * *